United States Patent [19]

Martin et al.

[11] 4,063,779
[45] Dec. 20, 1977

[54] DUMP TRUCK LOAD TRANSFER DEVICE

[75] Inventors: Paul H. Martin, Willowdale; John C. Martin, Toronto, both of Canada

[73] Assignee: Diesel Equipment Limited, Toronto, Canada

[21] Appl. No.: 710,860

[22] Filed: Aug. 2, 1976

[51] Int. Cl.² .................................. B62D 61/12
[52] U.S. Cl. .......................... 298/22 P; 180/24.02; 280/81 R; 298/19 B; 298/23 R
[58] Field of Search ............. 298/17.5, 19 B, 22 P, 298/23 M, 23 R, 19 R, 1 R; 280/81 R, 638; 180/24.02

[56] References Cited

U.S. PATENT DOCUMENTS 3,112,100  11/1963  Prichard ................ 280/81 R X

FOREIGN PATENT DOCUMENTS 1,927,057  5/1969  Germany .................. 298/23 M

Primary Examiner—Robert J. Spar
Assistant Examiner—George F. Abraham
Attorney, Agent, or Firm—Fetherstonhaugh & Co.

[57] ABSTRACT

A load transfer device for transferring a portion of the load normally carried by the rear wheel sets of a dump truck to the front wheel sets of the dump truck. The device is in the form of a tag frame which is pivotably mounted on the tailgate of a dump truck so as to be movable between an elevated position in which the tag frame is disposed closely adjacent the tailgate and a lowered position in which the wheel set of the tag frame is in the current engaging position.

10 Claims, 4 Drawing Figures

DUMP TRUCK LOAD TRANSFER DEVICE

This invention relates to a dump truck axle weight load distribution apparatus. In particular, this invention relates to an axle load transfer device which is mounted on a tailgate of a dump truck.

PRIOR ART

The difficulties which result from the variation in load applied to the axles of a road-going vehicle when loaded and unloaded and one method of overcoming these difficulties is described in Canadian Pat. No. 724,524, Dec. 28, 1965 and U.S. Pat. No. 3,112,100 dated Nov. 26, 1963. These patents describe a tag frame for use in association with load-carrying vehicles such as concrete mixers and dump trucks. One of the difficulties encountered in applying the teachings of this patent to dump trucks resides in the fact that it is necessary to modify an existing dump body to accommodate the tag frame. In order to avoid an excessive overhang at the side of the dump body, the width of the dump body is reduced towards its rear end to accommodate the tag frame. By reason of the fact that the tag frame is mounted directly on the side walls of the dump body the tag frame is relatively large. In addition, the tag frame must have an opening between the legs thereof which is sufficiently large to permit the load which is being discharged from the dump body to pass therethrough. Furthermore when the dump body is in the dumping position, the tag frame is lowered towards the ground surface so that there is not much clearance between the wheel set of the tag frame and the ground. This creates difficulties when attempting to discharge a load into the hopper of an apparatus such as a road surface topping machine.

The present invention overcomes the difficulties of the prior art by mounting the load transfer device on a tailgate. As a result of the fact that the load transfer mechanism is mounted on the tailgate, it is possible to replace the existing tailgates of existing dump trucks with tailgates having the load transfer mechanism mounted thereon without requiring extensive modification to the dump body. Additionally the mounting of load transfer device directly on the tailgate ensures that the load transfer mechanism including its associated wheel set is disposed clear of the discharging path of the load during the dumping operation and spaced a substantial difference above the ground during the dumping operation.

SUMMARY

According to an embodiment of the present invention, there is provided in a dump truck the improvement of axle load distribution means which comprises a tag frame having a wheel set mounted for rotation at the back end thereof and means at the front end of the tag frame for pivotably mounting it with respect to a tailgate for movement between a first elevated position in which the tag frame is disposed closely adjacent the tailgate with its wheel set elevated out of ground engagement and a second lowered position in which the wheel set engages the roadway and serves to transfer a portion of the load carried by the rear wheel sets to the front wheel sets and loading means extending between the dump body and the tag frame operable to move the tag frame between the first and second positions.

According to a further embodiment of the present invention, there is provided a tailgate load transfer device which comprises a tailgate, a tag frame, a wheel set mounted for rotation on the tag frame, and load transfer means extending between the tag frame and the tailgate. The tag frame is pivotably mounted with respect to the tailgate for movement between a first position in which it is disposed and a face-to-face relationship with respect to the tailgate and a second position in which it is extended rearwardly from the tailgate.

PREFERRED EMBODIMENT

The invention will be more clearly understood after reference to the following detailed specification read in conjunction with the drawings wherein.

Figure 1:
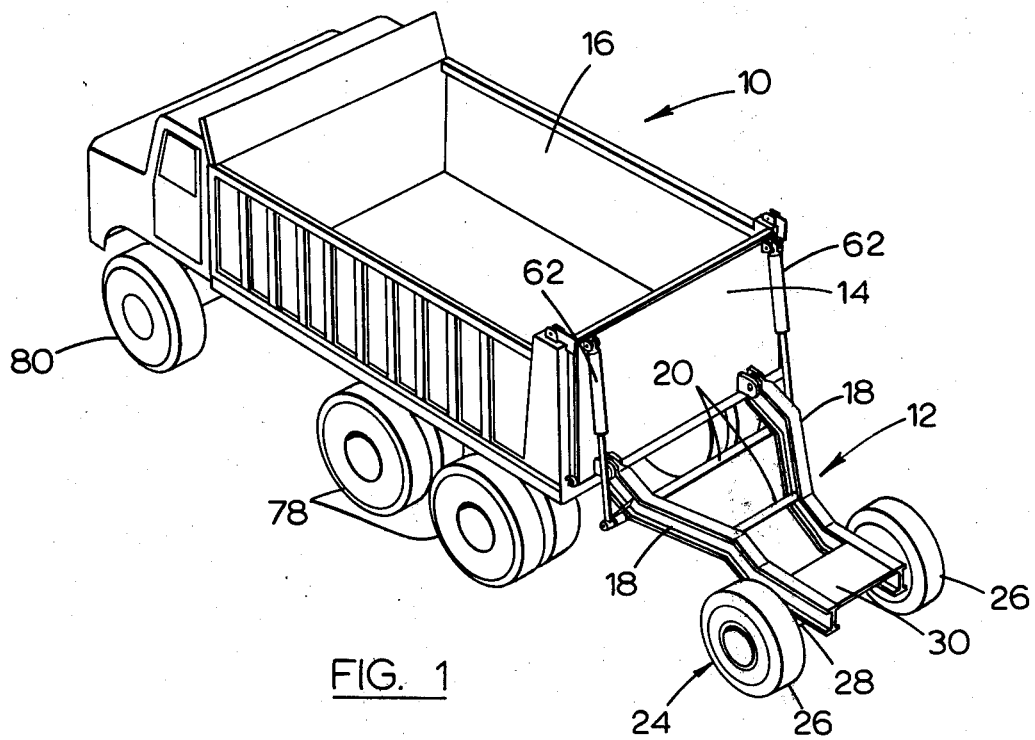
FIG. 1 is a pictorial view of the rear end of a dump truck having a tailgate load transfer device of the present invention mounted thereon.

With reference to the drawings, the reference numeral 10 refers generally to a dump truck which has a tag frame 12 mounted on the tailgate 14 of the dump body 16. The tag frame 12 consists of a pair of I-beams 18 which are secured to one another by means of transverse beams 20. A wheel set 24 having a pair of wheels 26 mounted on an axle 28 is mounted on the beams 18 by means of an undercarriage structure generally indentified by the reference numeral 30. The wheel set 24 is mounted to caster freely with respect to the undercarriage structure in a well known manner. Suitable suspension springs are provided for mounting the axle with respect to the undercarriage 30 in a well known manner. The undercarriage 30 includes a pair of lug members 34 which extend downwardly from the beams 18. An arm 36 is pivotally mounted with respect to the lugs 34 and extends rearwardly therefrom. The axle 28 is mounted on the arm 36 so as to pivot about its pivotal connection with the lugs 34 in order to permit movement of the suspension. Hook members 40 project forwardly from the beams 18 and when the tag frame is in the lowered position, it underlies and engages the locking bars 44 which are secured to and project outwardly from the dump body. The hook members 40 provide mechanical stop means which limit the downward movement of the tag frame to prevent the tag frame lifting the rear wheels of the vehicle off of the ground under any circumstances. The front end of each beam 18 is located between spaced apart lugs 46 which are mounted on and project outwardly from the tailgate 14. The lugs 46 are pivotally connected to the front ends of the beams 18 by means of pivot pins 50. The tailgate 14 is in the form of a conventional tailgate which is pivotably mounted with respect to the dump body at its upper end by means of pivot pins 54 which extend through lugs 56 mounted on the body 16. The tailgate is normally latched in a closed position in a conventional manner by means of a releasable latch plate 58 and a complementary latch pin 60. The tag frame is raised and lowered and the axle loading of the dump truck is adjusted by means of a pair of double acting hydraulic cylinders 62. The hydraulic cylinders 62 are mounted on the tailgate 14 by means of pivot pins 64 which are carried by lugs 66 which project from the tailgate 14. The other end of the hydraulic cylinder 62 is secured by means of pivot pins 70 to lugs 68 which are mounted on the beams 18 of the tag frame. Hydraulic fluid is supplied to the hydraulic cylinder 62 by suitable conduits (not shown) from a conventional hydraulic pump carried by the dump truck.

Figure 3:
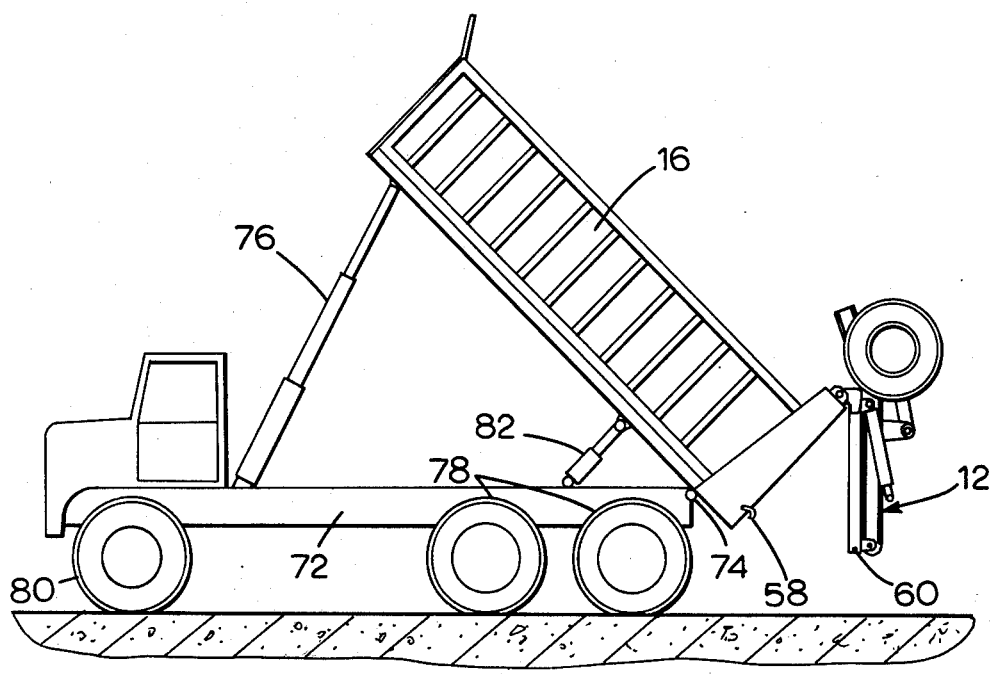
FIG. 3 is a side view similar to FIG. 2 showing the dump body in the dumping confirguration.

The dump body 16 is pivotally mounted on the body frame 72 by means of a conventional pivotal mounting structure 74 and is raised to the position shown in FIG. 3 of the drawings by means of the conventional hydraulic jacking mechanism generally indentified by the reference numeral 76. The rear wheel sets 78 and the front wheel set 80 serve to support the body frame in a conventional manner.

Figure 2:
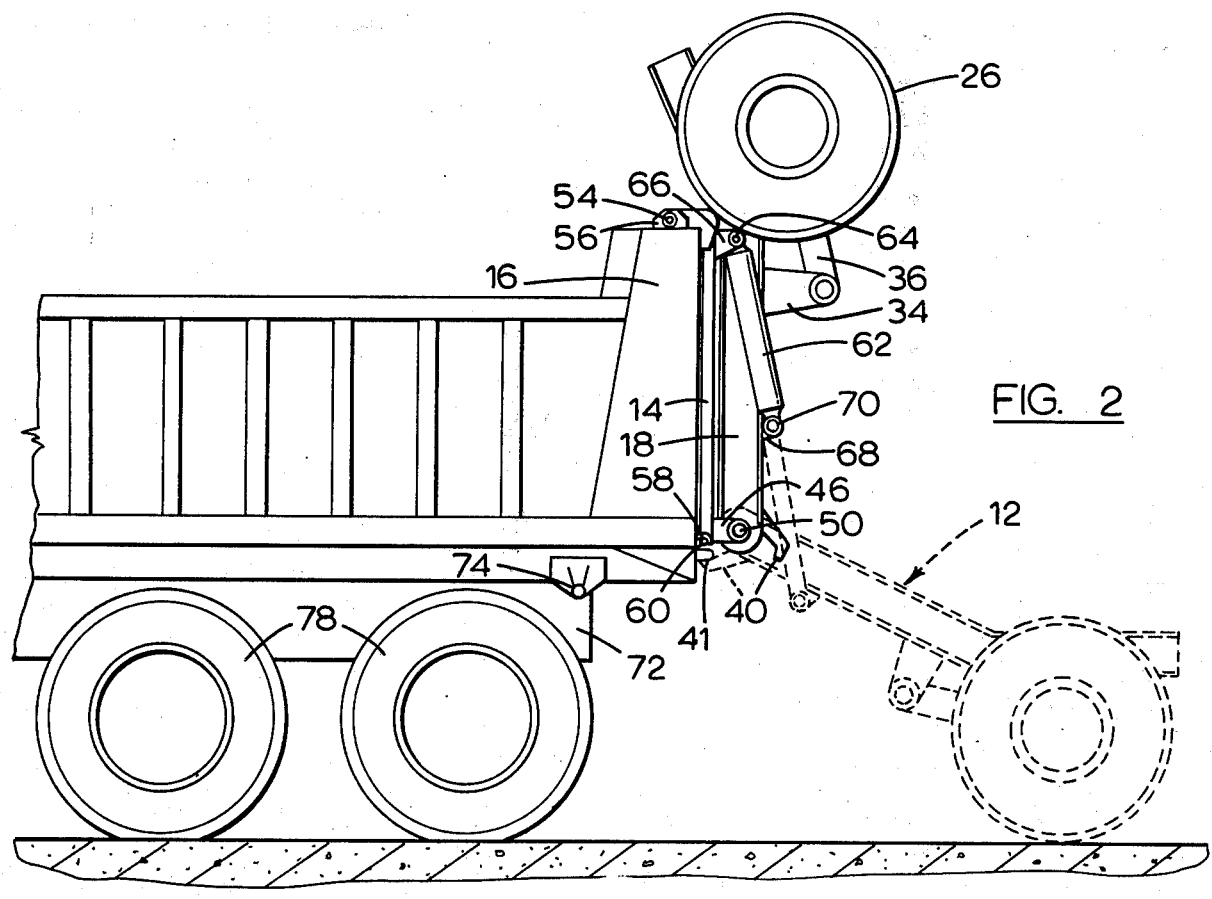
FIG. 2 is a side view of the dump truck of FIG. 1 showing the tailgate in the elevated position.

In use, when the dump truck is running in an empty condition, tailgate 14 is latched in the closed position and hydraulic cylinder 62 activated in order to locate the tag frame in the elevated position shown in FIG. 2 of the drawings. In this position, the wheel sets 26 are maintained out of engagement with the road surface by means of the hydraulic cylinder 62 and the tag frame 12 is locked in a face-to-face relationship with respect to the tailgate 14. The tailgate is maintained in its closed position by means of the conventional latch 58 and latch pin 60 as previously described. The truck will run with the tag frame in this configuration when empty and the tag frame will be moved to this position just prior to unloading of the truck by way of tailgate. To unload the dump truck, latch 58 is released from the latch pin so that the tailgate is free to open with the tag frame 12 located in the elevated position. The hydraulic lifting jack 76 is then activated so that the dump body is elevated to the position shown in FIG. 3 of the drawings. By carefully proportioning the tag frame, it has been found possible to balance the interlocked tailgate and frame so that it will hang substantially vertically as shown in FIG. 3 of the drawings as the dump body is elevated. If such a balance cannot be achieved, the tailgate may be opened by providing a power assist in the form of additional hydraulic cylinder operable between the dump body and the tailgate to maintain the tailgate in the open position. In certain applications, the turning moment about the pivot pin 74 due to the increased mass of the combination tailgate and tag may be such that it is necessary to provide a secondary hydraulic cylinder 82 extending between the dump body 16 and the body frame 27 which is operable to lower the dump body. In other applications, the moment created by the weight of the dump body will, by itself, be sufficient to cause the body to lower after dumping.

When the dump truck is to be loaded or after it is loaded, the tag frame is lowered by activating the hydraulic cylinder 62 to the position shown in FIG. 1 of the drawings. In order to transfer some of the load applied to the rear wheel sets 78, the hydraulic cylinder 62 is activated to force the tag frame downwardly. The greater the downward force applied by the hydraulic cylinders 62, the greater the proportion of the load which is transferred from the rear wheel sets 78 to the front wheel set 80. As previously indicated, the hook members 40 engage the locking bars 44 and serve to limit the extent of movement of the tag frame in the downward direction to that sufficient to permit an andequate load transfer.

Figure 4:
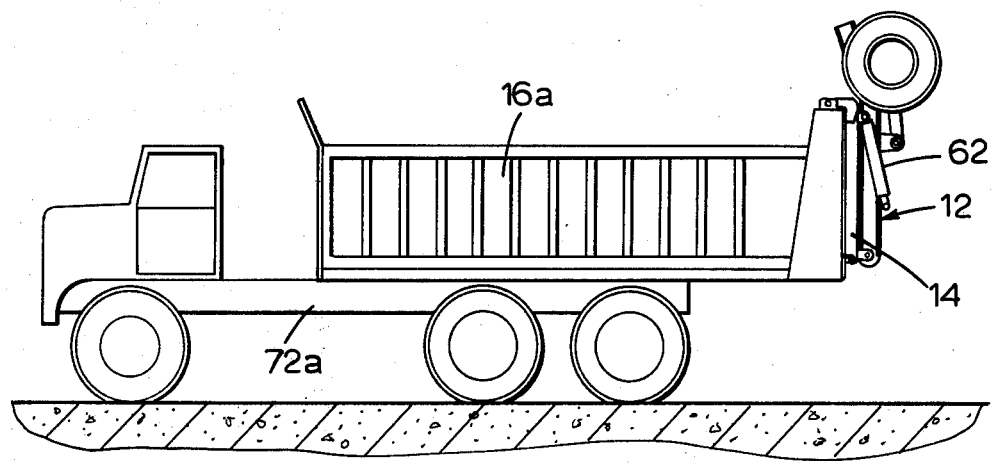
FIG. 4 is a diagrammatic side view of the tag frame mounted on the tailgate of a truck having a dump body which is longitudinally movable with respect to the body frame.

As shown in FIG. 4 of the drawings, the tag frame 12 and its associated tailgate 14 may be mounted on a dump body 16a of a type which is longitudinally movable with respect to the body frame 72a. In this embodiment longitudinal adjustment of the position of the dump body 16a may be used to adjust the axle weight load distribution in addition to variation in the load applied by the hydraulic cylinder 62.

Various modifications of the present invention will be apparent to those skilled in the art. For example, the load transfer mechanism may be in the form of a mechanical linkage which may supplement or replace the hydraulic mechanism described above. A mechanical locking mechanism may include upper link arms pivotally conected to the tailgate and lowerlink arms pivotally connected to the tag frame members 18. The upper link arms may be pivotally connected at their inner ends to the lower link arms. The link arms being of equal length and designed so as to be foldable upon themselves when the tailgate is raised. An additional hydraulic cylinder may be mounted on the tag frame members and connected to the lower link arm. This additional hydraulic cylinder would serve to move the link arms over the centre line extending between the pivotal connection to the tag frame and tailgate to lock the link arms in a position shown in an over centre position to prevent raising of the tag frame in use. The connection between the link arms being designed to prevent further movement of the link arm in a direction beyond said centre line when the tag frame is in the lowered position. The hydraulic cylinder would serve to effect the raising and lowering of the tag frame and the link arms serve to lock the tag frame when it is in the lowered position. The additional hydraulic cylinder serves to move the link arms over the centre line and to retain the link arms in this position when the apparatus is running in the loaded condition.

From the foregoing, it will be apparent that the use of a tag frame mounted on the tailgate of a dump body facilitates an increase in the pay load which may be carried by existing dump trucks without requiring extensive modifications to the structure of the dump body. The increased pay load is derived from the more even distribution of the load carried by the asles of the dump truck and the fact that the tag frame provides an additional axle which carries a portion of the load. The tag frame serves to transfer the load from overloaded rear axles to underloaded front axles increasing the legal pay load which may be carried by the dump truck. When the tag frame is in the elevated position, it transfers load from the non-driven front wheels to the driven rear wheels to provide extra traction in dump site locations which are frequently unpaved. When the tag frame is not in use, it is elevated completely clear of the road surface. Furthermore, when the tag frame of the present invention is elevated, it does not interfere with the operation of the truck or tailgate when dumping a load into a stock pile or the hopper of a road building machine or the like.

By mounting the tag frame directly on a tailgate, it is possible to achieve the load transfer characteristics of a tag frame while maintaining the structure of the tag frame as a relatively light-weight structure. It is important to maintain the tag frame weight as light as possible so as to avoid a situation where the weight of the tag frame itself detracts from the pay load which may be carried by the dump truck. In addition, by reason of the fact that the tag frame is mounted directly on the tailgate, it is possible to fit the tag frame and tailgate to existing dump trucks without difficulty. It will be noted that the complete assembly can be removed very quickly by releasing the pivot pins 50 and 64 and by disconnecting the hydraulic fluid lines which supply fluid to the hydraulic cylinder 62. It is, therefore, possible for a contractor to retain a single tag frame unit which may be mounted with ease on any one of a number of dump trucks according to his requirements.

These and other advantages of the present invention will be apparent to those skilled in the art.

It will also be apparent that the axle load distribution means of the present invention may be used in association with a dumping semi-trailer or the like in addition to the standard truck of the type previously described.

The embodiments of the invention in which an exclusive property or privilege is claimed are defined as follows:

1. In a dump truck having a dump body which includes a tailgate for closing the discharge end thereof, said tailgate being pivotably mounted at its upper end to said dump body and releasably latchable at its lower end with respect to said dump body, the truck having a body frame supported by front and rear wheel sets, the improvement of an axle load distribution means comprising,
   a. a tag frame having a front end and a back end,
   b. a wheel set mounted for rotation on said tag frame at the back end thereof,
   c. means at said front end of said tag frame pivotably mounting said tag frame with respect to said tailgate for movement between a first elevated position in which said tag frame is disposed closely adjacent said tailgate with its wheel set elevated out of ground engagement and a second lowered position in which said wheel set is in ground engagement and serves to transfer load from said rear wheel set to said front wheel set,
   d. loading means extending between the dump body and the tag frame operable to move said tag frame between said first and second positions.

2. A dump truck as claimed in claim 1 wherein said loading means comprises hydraulic cylinder means having one end connected to said tag frame and another end connected to said tailgate.

3. A dump truck as claimed in claim 2 wherein said tag frame and tailgate are proportioned to hang vertically in all positions of said dump body when said tailgate is unlatched for dumping whereby said tag frame is removed from the path of the discharging load.

4. A dump truck as claimed in claim 1 including means communicating between said dump body said body frame for lowering said body from its elevated dumping position to overcome the turning moment applied by the weight of the tag frame.

5. A dump truck as claimed in claim 1 wherein said front end of said tag frame is pivotably mounted with respect to said tailgate adjacent the lower end of said tailgate such that said tag frame is disposed above said lower end of said tailgate when in said elevated position.

6. A dump truck as claimed in claim 1 wherein said dump body is longitudinally adjustable with respect to said body frame whereby the axle load transfer achieved by the tag frame may be adjusted by moving the dump body with respect to the body frame.

7. A tailgate load transfer device for use on a dump truck to effect a load transfer between the front and rear wheel sets of a truck comprising
   a. a tailgate having an upper end and a lower end means at the upper end of said tailgate for pivotably mounting it with respect to said dump body and means at the lower end of said tailgate for releasably latching it in a position closing the rear end of a dump body,
   b. a tag frame having a front end and a back end,
   c. a wheel set mounted for rotation on said tag frame at the back end thereof,
   d. means at the front end of the tag frame pivotably mounting the tag frame with respect to the tailgate for movement between a first elevated position in which the tag frame is disposed in a face-to-face relationship with respect to the tailgate and a second position in which the wheel set of the tag frame is spaced a substantial distance from the tailgate,
   e. hydralic cylinder means having one end mounted on said tag frame and the other end mounted on said tailgate, said hydralic cylinder means being operable to move said tag frame between said first and second positions.

8. A tailgate load transfer device as claimed in claim 7 wherein said front end of said tag frame is pivotably mounted with respect to said tailgate adjacent the lower end thereof.

9. A tailgate load transfer device as claimed in claim 7 wherein said hydraulic cylinder means is mounted adjacent the upper end of said tailgate.

10. A dump truck as claimed in claim 1 including mechanical stop means for limiting the downward movement of said tag frame with respect to said dump body.

* * * * *